May 21, 1929.          G. A. HERRON          1,713,828
WHIPPER
Filed March 29, 1927
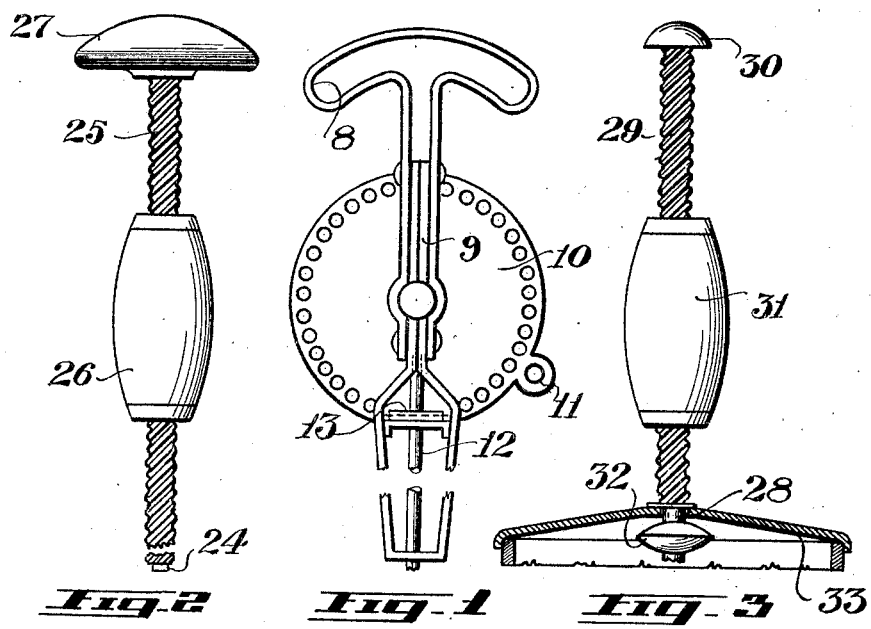
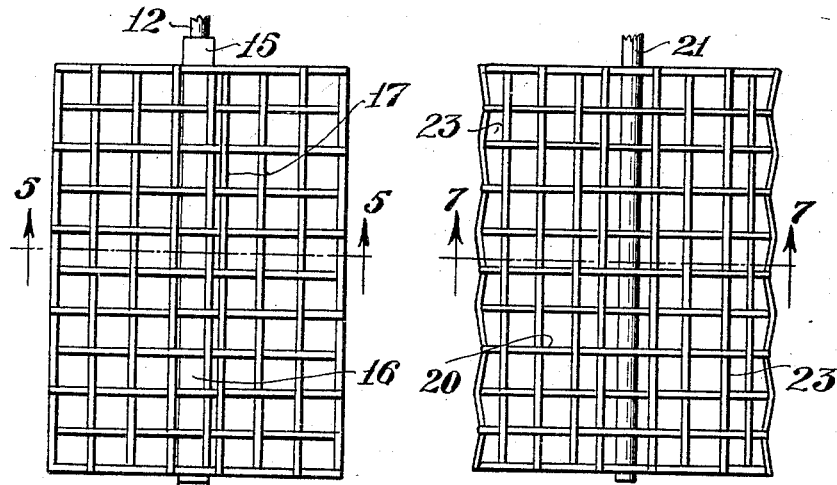
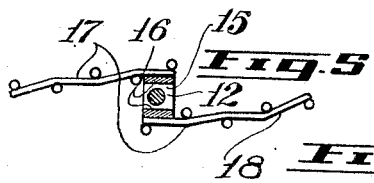
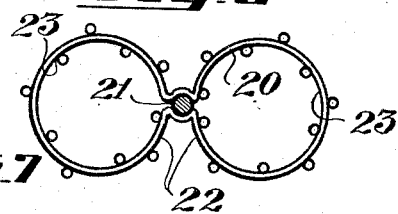
INVENTOR
George A. Herron
By
Harold D Penney Attorney Patented May 21, 1929.

1,713,828

UNITED STATES PATENT OFFICE.

GEORGE A. HERRON, OF OTTAWA, ONTARIO, CANADA, ASSIGNOR OF FIFTY-ONE PER CENT TO T. BERT COLE, OF OTTAWA, CANADA.

WHIPPER.

Application filed March 29, 1927. Serial No. 179,267.

This present invention relates to improvements in a whipper and appertains particularly to a device of this character adapted for whipping cream, beating eggs, mixing dressings and the like.

The primary object is to provide a whipper that will accomplish the desired result in less time than conventional contrivances of a like nature.

A further object of the invention is to provide a whipper of this nature wherein a reticulated wire screen beating element is employed that thoroughly agitates the substances being whipped and adequately impregnates it with air.

A still further object of the invention is the provision of a whipper of the class set forth that is characterized by structural simplicity, a minimum of operating parts, ease of operation and low cost of production, being thereby rendered commercially desirable.

To the accomplishment of these and related objects, my invention resides in the construction, combination and arrangement of parts as shall be hereinafter more fully described, illustrated in the accompanying drawings and pointed out in the claims hereunto appended.

The invention will be best understood and can be most clearly described when reference is had to the drawings, forming a part of this disclosure wherein like characters indicate like parts throughout the several views.

In the drawings:—

Fig. 1 is an elevation of the upper portion of a whipper of usual form;

Figs. 2 and 3 are elevations of the upper parts of modified forms of this whipper;

Fig. 4 is an elevation of the preferred form of beating element applicable for use with any or either of the several types of shaft rotating means shown;

Fig. 5 is a transverse section on the line 5—5 of Fig. 4, looking in the direction of the arrows;

Fig. 6 is an elevation of a slightly modified beating element, the same reticulated wire screen material being employed as seen in Figs. 4 and 5; and Fig. 7 is a transverse section on the line 7—7 of Fig. 6, looking in the direction of the arrows.

Though the mechanism by which the movable parts of cream whips or egg beaters are actuated seems satisfactory and in most cases of a highly efficient nature, difficulty has always been experienced in providing a beating or whipping element for use therewith that would meet the present day need for a rapid acting device. In seeking to accomplish the objects as hereinbefore enumerated and provide for obviating this undesirable condition, the invention provides a beating element adapted for application to and rotation by a unitary stem or shaft that may be rotated in any of the desirable or approved ways, as for instance by a crank rotated gear meshing with a pinion carried by the beater shaft, or a vertically reciprocable member threaded on the upper portion of the stem. Thus it is to be clearly understood that the invention may employ any of the forms of shaft rotating mechanism illustrated or suggested.

Particular reference will now be had to the attached drawings, the numeral 8 designating the handle part of a whipper frame 9 in which frame a rotatable gear 10 is journalled. A crank member 11 is provided for the use of the operator whereby the gear is actuated. The whipping shaft 12 supported by the frame 9 is disposed vertically, having a pinion 13 rigidly fixed near its upper end that meshes with the gear 10.

The extreme lower end 14 of this shaft 12, as seen in Fig. 4, is pointed and projects centrally through the base of a flat strip U-shaped holder 15, the arms 16 of which extend up, one on either side, of the shaft 12, terminating near the lower end of the shaft supporting frame 9 where they are soldered or otherwise suitably fastened to the said shaft.

The whipping element applied to this U-shaped holder 15 comprises a pair of rectangular wire screens 17 of proper gauge, which reticulated wire screen members extend radially from the shaft 12 in opposite directions or possibly more properly explained as disposed "tangentially" to the rotating support; at any event, the rectangular wire screens spread outwardly from the shaft and their exact relation thereto is incidental to the fact that they are subject to actuation on the rotation thereof, and obviously if the holder 15, which is not an essential part, was dispensed with, the connection of the screens 17 to the shaft 12 would be altered. The outer ends of the screens 17 may be inclined forwardly, as at 18, in the direction of the usual rotation thus providing concave or cupped beating walls to engage the cream, or just the upper outside corners of the screens can be turned forwardly to serve to retain or enclose the body of liquid on which the whipper is working causing it to pass through and be battered by the screens.

In Figures 6 and 7, the wire screen beater 20 is shown as one piece and applied directly to the rotatable shaft 21, without employing the holder 15. The free ends 22 are rolled back to join and fasten to the shaft thus forming a pair of diametrically disposed vertical cylinders 23. No concave beating surface is thus provided but with this form, the cream tends to pile up in a wave about the wall of the container and breaking, to fall or flood back over the upper rim into the cylinders.

Different treatment has been accorded the upper ends of the rotatable beater shafts in Figs. 2 and 3; in the former, the shaft 24 has its upper part 25 as a threaded stem with a vertically reciprocable handle 26 threaded thereon and topped with a freely rotatable head 27. In the latter the stem 28 is similarly threaded at 29 at the top and finishes with an integral and enlarged head 30; a correspondingly operating handle 31 rides on the thread. The stem 28 however has a flange 32 adjacent the lower end of the thread 29 and has carried thereon between the said thread 29 and flange 32 a utensil cover member 33 adapted to serve as a top closure for a suitable container or receptacle for holding the substance to be whipped during the operation. So while with the form of shaft rotating mechanism shown in Fig. 2, the operator rests one hand on the cap 27 and reciprocates the handle 26 up and down on the thread 25 causing the shaft 24 to rotate or oscillate; with the construction illustrated in Fig. 3, one hand is allowed to rest on the cover 33 to steady the same while with the other hand the handle 31 is reciprocated as in the previous instance.

The detailed construction, use and modus operandi of the invention should now be perfectly clear so that it will suffice in conclusion to say that it is within the purpose of this invention to employ either of the forms of screen beater shown, applied to the shaft in the most desirable manner and actuated by any of the known and approved means that one may choose.

From the foregoing description taken in connection with the accompanying drawings, it will be manifest that a whipper is provided that will fulfill all the necessary requirements of such a device, but as many changes could be made in the above description and many apparently widely different embodiments of my invention constructed within the scope of what is claimed without departing from the spirit or scope thereof, it is intended that all matters contained in said accompanying specification and drawings shall be interpreted as illustrative and not in a limited sense.

Having thus described my invention, what I claim as new and desire to secure by Letters Patent is:—

1. A whipper including a manually rotatable shaft; and cylindrical whipper members of reticulate form supported on diametrically opposite portions of said shaft.

2. A whipper including a rotatable shaft; and a pair of circular reticulate whipper members with open upper and lower ends, secured in upstanding position on opposite sides of said shaft.

In testimony whereof I hereunto affix my signature.

GEORGE A. HERRON.